United States Patent [19]
Walter

[11] 3,845,319
[45] Oct. 29, 1974

[54] METHOD AND APPARATUS FOR THE ACCURATE DETECTION OF THE PASSAGE OF THE EDGE OF A STRAIGHT CONTRAST JUMP

[75] Inventor: Arthur Walter, Denzlingen, Germany

[73] Assignee: Erwin Sick

[22] Filed: July 30, 1973

[21] Appl. No.: 383,555

Related U.S. Application Data

[63] Continuation-in-part of Ser. No. 298,367, Oct. 17, 1972, abandoned.

[30] Foreign Application Priority Data
Oct. 22, 1971  Germany............................ 2152732

[52] U.S. Cl.................. 250/555, 250/202, 250/209
[51] Int. Cl............................................. G08c 9/06
[58] Field of Search .......... 250/202, 209, 556, 557, 250/221, 222, 206, 208, 555

[56] References Cited
UNITED STATES PATENTS

| | | |
|---|---|---|
| 3,490,002 | 1/1970 | Hardin et al................... 250/202 X |
| 3,527,953 | 9/1970 | Chitayat......................... 250/202 X |
| 3,609,237 | 9/1971 | Gerber........................... 250/202 X |
| 3,718,821 | 2/1973 | Vischulij........................... 250/202 |

*Primary Examiner*—Walter Stolwein
*Attorney, Agent, or Firm*—Watts, Hoffmann, Fisher & Heinke Co.

[57] ABSTRACT

A sudden contrast or jump is sensed as it is moved past sensors that measure brightness in three successive adjacent areas. An output signal is produced as the contrast jump moves into the central area in response to a total signal value falling below a first threshold value. The total signal value is proportional to the absolute value of the sum of the brightness values of the first and third areas less twice the brightness value of the central area. As a result the contrast jump is detected at a predetermined position within the area scanned rather than at a position that varies for different contrast ratios. The detection of the passage of a contrast jump can be used, for example, to control a machine.

15 Claims, 7 Drawing Figures

METHOD AND APPARATUS FOR THE ACCURATE DETECTION OF THE PASSAGE OF THE EDGE OF A STRAIGHT CONTRAST JUMP

CROSS REFERENCE TO RELATED APPLICATION

This application is a continuation-in-part of copending U.S. Pat. application Ser. No. 298,367, filed Oct. 17, 1972, now abandoned.

BACKGROUND OF THE INVENTION

1. Field of the Invention

The invention relates to a method of accurately detecting the momentary position of a straight boundary where a sudden change in visual appearance occurs, referred to herein as a contrast jump, which is travelling in a direction substantially at right angles to that in which it extends, the variation in brightness of a defined area as the contrast jump passes it being measured by means of a photo-electric cell.

2. Prior Art

It is known to detect such a jump in contrast by registering with a photo-electric cell the brightness change of the zone through which the jump in contrast passes. When a predetermined photo-current is produced, a circuit is triggered which indicates the passage of the contrast jump. Generally, the observation takes place on a broad dark mark made on a light-hued carrier (e.g. paper). An optical system registers light from the carrier on a photo-electric cell, the area registered on, i.e., viewed by, the photo-electric cell being designated, say, F.

When the contrast jump passes through the area F, so that for example a light field is replaced by a dark field, then at any point in time during passage of the contrast jump, a part $d$ of the area F will comprise the dark field, while the remainder of the area $h$ will be comprised by a light field, so that the sum of both fields $d$ and $h$ constitute the entire area F. In other words:

$$F = h + d.$$

Normally a switching amplifier is connected to the photo-electric cell and is in one condition when the cell as a whole sees the light field, while it is in another condition when the photo-electric cell sees the dark field.

The ratio of currents of the photo-electric cell for a definite predetermined light mark in relation to a definite predetermined dark mark will be termed $b$.

In order to guarantee reliable operation of a switching amplifier controlled by the photo-electric cell, the ratio of the current emitted by the photo-electric cell when it sees the light mark, to the current produced in response to the dark mark, must be at least of a value $a$. Since this ratio $a$ should assure reliable switching, the actual switching point will have been reached at a substantially smaller value, e.g. $\sqrt{a}$.

Both $a$ and $b$ must each be greater than 1; that is, more current must be emitted in response to the light area than the dark at the predetermined relation between the light and dark marks and also at the time the switching amplifier is to be operated; and $b$ must equal $a$ for the switching operation to occur.

The problem with the known apparatus resides in the fact that for given values $a$ and $b$, the switching occurs at different proportions of darkened and lightened area. This means that although the contrast jump is indicated in response to a constant switching ratio $a$, this value can occur at different positions within the area scanned for different contrast ratios between areas $d$ and $h$. This results in inaccuracies in evaluating the time at which the jump occurs, inaccuracies which cannot be accepted particularly if considerable accuracy is required when detecting a jump in contrast.

It is a principal disadvantage of the known apparatus, then, that the accuracy of detection of the contrast jump is adversely affected by differences in contrast ratio, different color intensities, different strength of illumination (lamp brightness, extraneous light) and different switching thresholds of the connecting amplifiers (e.g. due to the influence of temperature, variation in supply voltage etc.). Moreover, the switching threshold must be accurately adjusted, which can constitute a substantial source of errors.

Attempts have already been made to alleviate these disadvantages by stabilizing the lamp voltage or by measuring the lamp brightness with a subsequent comparison of this value with the brightness value of the surface.

SUMMARY OF THE INVENTION

The object of the invention consists in providing a method and an apparatus of the types described above, but in which the position of a contrast jump located on a moving path can be very accurately detected. The signal obtained, furnished by passage of the contrast jump, is intended to serve, for example, as a controlling instruction for a machine.

According to the invention accurate detection of the passage of a contrast jump in a given area $f$ is achieved by measuring, in addition to the brightness ($i_v$) of the area $f$, the brightness ($i_1$, $i_2$) of two identical areas respectively in front of and behind a defined area $f$, and subtracting from the sum ($i_1 + i_2$) of these additionally measured brightness values, twice the value of the brightness signal ($2 \cdot i_v$) of the defined area $f$, to produce an overall signal ($I_1$). The fall of the absolute value of the overall signal ($I_1 = | i_1 + i_2 - 2 \cdot i_v |$) below a given threshold ($k_1$) is taken as the time of passage of the contrast jump. On the basis of this pattern of procedure, a signal is obtained which, independently of the magnitudes which hitherto resulted in errors, always indicates the contrast jump at an accurately defined location on the area being scanned. According to the invention, therefore, switching occurs exactly when the contrast jump is passing over the central line of the middle photo-electric cell. It is possible to achieve a switching accuracy of the order of 1/100 mm or even less.

According to a preferred mode of operation, the overall signal is used only if the brightness signals of the two additionally measured areas are not equal. This construction avoids an output signal appearing when a light or dark field is simultaneously present on all the areas scanned.

By using the method according to the invention, it is also possible to differentiate between light-dark and dark-light jumps in that the total signal is only utilized if the difference between the brightness signals of the additional areas is greater or smaller than a predetermined threshold value.

The preferred apparatus for carrying out the method according to the invention with a photo-electric cell which scans a rectangular area of the object exhibiting the contrast jump, is characterized according to the invention in that two further photo-electric cells are provided which scan equally sized rectangular areas in front of and after the central area. At the same time, the three areas are preferably immediately adjacent to one another.

The outputs of the photo-electric cells are preferably linked to a operational amplifier which deducts twice the signal from the first photo-electric cell from the sum of the signals of the two additional photo-electric cells. Connected after the operational amplifier, a comparator is provided which ideally only emits an output signal when the absolute value of the operational amplifier output is smaller than the predetermined threshold. Therefore, the arrangement involved here is a digital one which knows only the conditions 0 and 1. Preferably, a second operational amplifier is provided which establishes the differential of the output signals of the additional photo-electric cells. A second comparator can be connected to the output of the second operational amplifier to emit an output signal only when the difference in the output signals is greater than a predetermined second threshold value.

Furthermore, it is contemplated to connect to the output of the second operational amplifier a third comparator which only emits an output signal if the difference is smaller than a further predetermined third threshold value.

The second and third comparators are expediently applied through an OR-gate to an AND-gate to which the first comparator output is applied.

According to a further form of embodiment, the outputs of the second and third comparators are each applied to an AND-gate, of which the other two inputs are connected to the output of the first comparator. A further form of this embodiment provides for the outputs of the AND-gates to be connected to a flip-flop of which one output emits a voltage upon a light-dark jump while its other output emits a voltage upon a dark-light jump.

In a preferred operation, the first threshold value is adjusted in proportion to the lamp brightness, so that the apparatus functions independently of the brightness of the lamp. As is well known, the brightness of the lamp may vary undesirably, due to a change in the supply voltage, or due to blackening or the like, which would normally affect the measurement accuracy. By means of the present invention, this disadvantage is effectively avoided. Expediently, a further photo-electric cell can be used to measure the lamp birghtness and render the threshold value proportional to the lamp brightness. The threshold value can also be made adjustable by providing a potentiometer in the amplifier.

It is essential that the absolute value of the first threshold be smaller than the absolute values of the other two threshold values. By suitably choosing the range of threshold values, an indication of negligible fluctuations in contrast can be avoided.

BRIEF DESCRIPTION OF THE DRAWINGS

The invention will now be described in greater detail and by way of example, with reference to the accompanying drawings, in which.

DETAILED DESCRIPTION OF A PREFERRED EMBODIMENT

Figure 1:
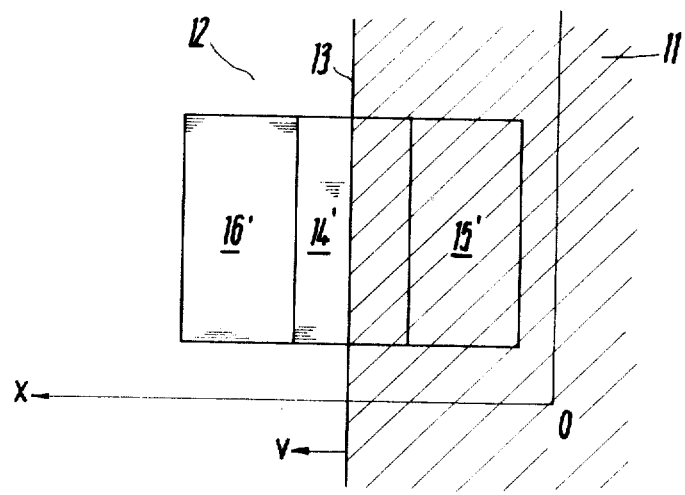
FIG. 1 is a plan view of an object on which there is a jump in contrast, the three scanning areas according to the invention being illustrated diagrammatically.

Referring to FIG. 1, a dark field 11 and a light field 12 of an object moving in the direction of the arrow v are separated from each other by a contrast jump 13. Movement is along the coordinate $x$, which is also reproduced in the diagrams shown in FIGS. 3 to 6 and explained hereinafter.

Figure 2:
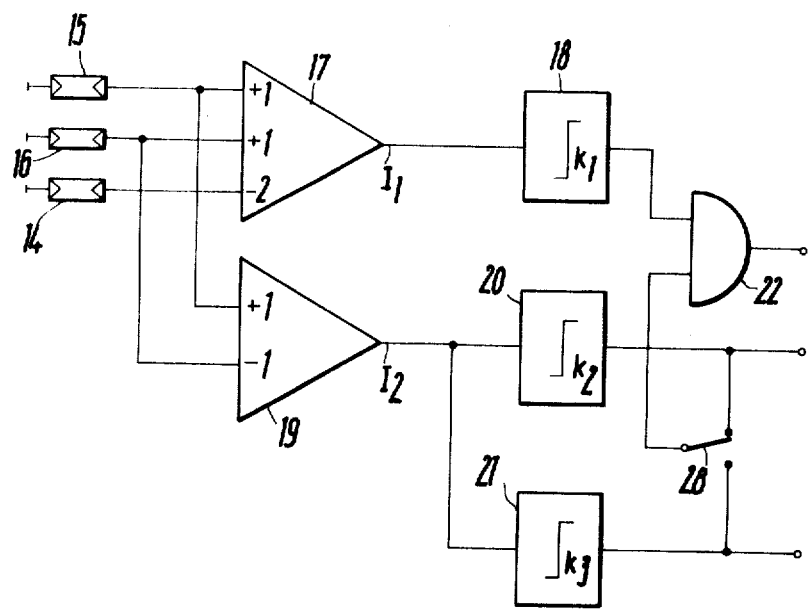
FIG. 2 shows a block wiring diagram of a preferred arrangement for connecting photo-electric cell groups according to the invention.

Three rectangular immediately adjacent zones 15', 14' and 16' are registered on three photo-electric cells 15, 14, and 16 shown in FIG. 2, so that the output signals of the three photo-electric cells correspond to the light reflected by the associated zones. According to the invention, the photo-electric cells 14, 15, 16 as shown in FIG. 2 are electrically connected to a operational amplifier 17 which links the three output signals in the following way:

$$I_1 = i_1 + i_2 - 2 \cdot i_v,$$

in which $i_1$ is the current of the photo-electric cell 15, $i_2$ is that of the photo-electric cell 16, $i_v$ is that of the photo-electric cell 14 and $I_1$ is the current at the output of the operational amplifier 17.

Connected to the output of the operational amplifier 17 is a comparator 18 which normally has the output 0, although it provides a constant output signal E when the output signal $I_1$ falls in value below a predetermined and optionally adjustable threshold value $k_1$:

The outputs of the photo-electric cells 15 and 16 are moreover, connected to a further operational amplifier 19, which forms the difference between the signals of the photo-electric cells 15, 16, in other words has an output signal as follows:

$$I_2 = i_1 - i_2.$$

Provided after the operational amplifier 19 are two comparators 20, 21, of which one (20) only emits an output signal E when $I_2$ is greater in value than a further threshold value $k_2$. The other comparator 21 only emits the output signal E when $I_2$ is smaller than a further threshold value $k_3$.

The outputs of the comparators 20, 21 are connectable through a switch 28 optionally to one input of one AND-gate 22 of which the other input is applied to the output of the comparator 18.

The manner in which the connection shown in FIG. 2 operates will now be explained in detail with reference to the diagrams in FIGS. 3 to 6.

Figure 3:
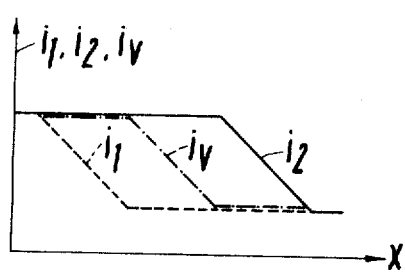
FIGS. 3 to 6 are diagrams illustrating the way in which the invention operates.

When the contrast jump 13 passes over the areas 15', 14' and 16' according to FIG. 1, current patterns $i_1$, $i_v$ and $i_2$ according to FIG. 3 occur at the associated photo-electric cells 15, 14 and 16.

Figure 4:
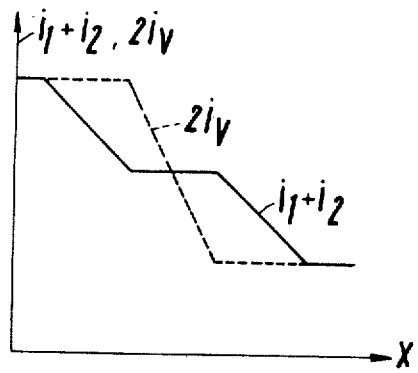

According to FIG. 4, the currents $i_1$ and $i_2$ are added together, and the current $i_v$ is doubled.

Figure 5:
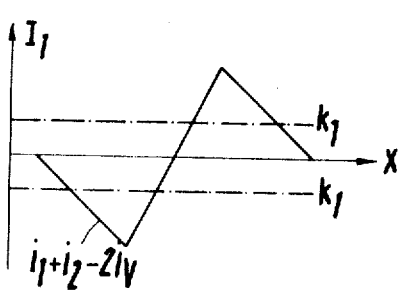

FIG. 5 shows the differential function which is formed according to the invention. Furthermore, the threshold values $k_1$ and $-k_1$ are reproduced, within which limits the comparator 18 supplies an output signal E.

Figure 6:
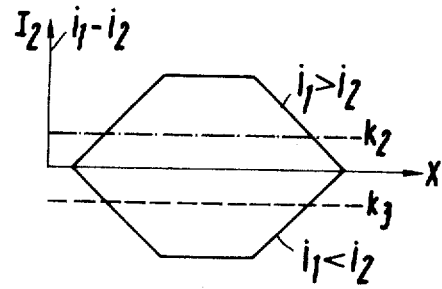

FIG. 6 reproduces the output signal of the computing amplifier 19 for two different contrast jumps. Where $i_1 - i_2$ is greater than 0 (zero, represented along the line of the arrow $x$) and the difference is greater than the threshold value $k_2$, the field 12 in FIG. 1 would be dark and the field 11 wound be light. On the other hand, if $i_2 - i_1$ is greater than 0 and is greater than a threshold value $k_3$, then the conditions shown in FIG. 1 apply, 11 is a dark field and 12 is a light field.

The connection arrangement according to FIG. 2 therefore provides on the one hand at the output of the comparator 18 a signal to indicate a contrast jump. Moreover, it is possible by means of the switch 28 to select whether indication is to occur upon a light-dark or dark-light jump. According to the invention, instead of the switch 28, it is also possible to use an OR-gate, so that a signal appears at any contrast jump at the output of the AND-gate 22.

Figure 7:
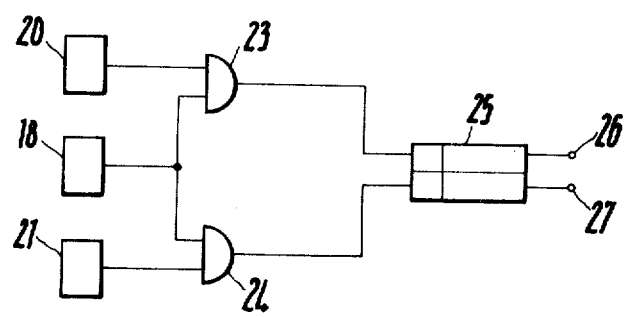
FIG. 7 is a modification of the block wiring diagram shown in FIG. 2.

FIG. 7 shows a particularly advantageous further development in accomplishing the desired objective of the application. Here, the comparators 20, 21 are applied to one input of two AND-gates 23, 24 of which the other input is applied to the output of the comparator 18. At the outputs of the two AND-gates 23, 24 therefore, appear the products of the input signals which jointly operate a flip-flop 25, the output 26 of which is live upon the transition from a light to a dark field, while the output 27 is live for a transition from a dark to a light field.

The circuit arrangements shown in FIGS. 2 and 7 are only contemplated as examples, although they are particularly suitable for the purposes of the invention. The circuit arrangements operate statically, i.e., independently of the speed at which the contrast jump runs over the photo-electric cells, which is a particular advantage. If a speed-dependent evaluation is desired, then according to the invention, this is possible on the same principle, using a dynamic circuit connection.

By virtue of the possibility of predetermining the threshold values $k_2$ and $k_3$ of the switching thresholds of the corresponding comparators, which is provided according to the invention, small contrasts can be suppressed, so that they do not result in the triggering of undesired contrast signals. Since $k_2$ and $k_3$ and preferably selectable independently of each other, also the threshold values for jumps from light to dark or dark to light can be adjusted independently of each other. What is essential, however, is that the absolute values $k_2$ and $k_3$ be always as great as or greater than the absolute value of $k_1$ in order to guarantee that only the desired passage of the value 1, below the absolute threshold value $k_1$ is detected.

What is claimed is:

1. A method for accurately detecting the passage of a contrast edge between first and second fields having unequal detectable brightness and moving past contrast sensing means where the edge extends essentially at right angles to the direction of movement of the edge, the steps comprising: concurrently measuring the brightness value of a first area in which the contrast edge is exhibited, of a second area in advance of the first area and of a third area subsequent to the first area, considered in relation to the direction of movement of the contrast edge, producing a total signal proportional to the absolute value of the sum of the brightness values of the second and third areas less twice the brightness value of the first area; and producing an output signal indicative of the passage of the contrast jump into said first area when the value of said total signal falls below a predetermined first threshold value, the value of the total signal as the edge traverses the first area being independent of the ratio of detectable brightness between the first and second fields.

2. A method according to claim 1 wherein said output signal is produced only when the brightness values of the said second and third areas are unequal.

3. A method according to claim 2 wherein said output signal is produced only when the difference between the brightness values of the second and third areas is greater than a predetermined second threshold value which is greater than the predetermined first threshold value.

4. A method according to claim 2 wherein the said output signal is produced only when the difference between the brightness values of the second and third areas is smaller than a predetermined negative threshold value, the absolute value of which is greater than the said first threshold value.

5. A method according to claim 1 including the steps of illuminating the fields with a light source and adjusting the first threshold value in proportion to the brightness of the light source.

6. Apparatus for accurately detecting the passage of a moving edge of optical contrast between first and second fields having unequal brightness of illumination, the edge of the contrast extending essentially at right angles to the direction of movement of the edge, said apparatus comprising a first photoelectric cell constructed and positioned to detect the brightness of a first area of said fields and stationary with respect to said fields and second and third photo-electric cells constructed and positioned to detect the brightness of second and third areas, said areas located respectively previous and subsequent to the area scanned by said first photo-electric cell, relative to the direction of movement of the edge, said photocells each having an output emitting a signal which is a function of the brightness of the area scanned by that photocell, said outputs of the photo-electric cells being coupled to means, including an operational amplifier generating a sum signal which is a function of the sum of the signal outputs of said second and third photocells less twice the output signal of the first photocell, for providing that the value of the sum signal as the edge traverses the first area is independent of the detected relative brightness of the first and second fields, the passage of said edge across said first area being indicated by the passage of the value of said sum signal through a predetermined first threshold value.

7. Apparatus according to claim 6 wherein the three said areas are immediately adjacent to one another.

8. Apparatus according to claim 7 including a comparator coupled to the output of the operational amplifier and constructed and arranged to emit an output signal only when the absolute value of the sum signal is smaller than a predetermined threshold value.

9. Apparatus according to claim 7 wherein a second operational amplifier is coupled to the outputs of said second and third photo-electric cells and produces a signal indicative of the differential between the output signals of the two said second and third photo-electric cells.

10. Apparatus according to claim 9 including a first comparator coupled to the output of the operational amplifier and constructed and arranged to emit an output signal only when the absolute value of the sum signal is smaller than a predetermined threshold value and a second comparator coupled to the output of the second operational amplifier, said second comparator emitting an output signal only when said differential is greater than a second predetermined threshold value.

11. Apparatus according to claim 10 wherein a third comparator is coupled to the output of the second operational amplifier, said third comparator emitting an output signal only when said differential is smaller than a predetermined further negative threshold value.

12. Apparatus according to claim 11 including means to selectively apply the outputs of the said second and third comparators to one input of an AND-gate, a second input of which is coupled to the output of the first comparator.

13. Apparatus according to claim 12 wherein the second and third comparators are applied to the AND-gate through an OR-gate 14. Apparatus according to claim 11 wherein the outputs of the second and third comparators are each applied to an AND-gate of which the other two inputs are connected to the output of the first comparator.

15. Apparatus according to claim 14 wherein the outputs of the AND-gates are connected to a flip-flop of which one output emits a voltage upon the passage of a contrast edge between a first lighter field and a second darker field while its other output emits a voltage in the case of passage of an edge between a first darker and second lighter field.

* * * * *